United States Patent [19]
Keller

[11] Patent Number: 5,430,645
[45] Date of Patent: Jul. 4, 1995

[54] ROBOTIC SYSTEM FOR TESTING OF ELECTRIC VEHICLES

[76] Inventor: A. Scott Keller, 2012 Rock Bluff Rd., Hixson, Tenn. 37343

[21] Appl. No.: 117,589

[22] Filed: Sep. 7, 1993

[51] Int. Cl.6 .......................... G06G 7/00; G01P 15/00
[52] U.S. Cl. ..................... 364/424.01; 364/426.01; 364/426.04; 324/160; 340/441
[58] Field of Search ............ 364/424.01, 426.01, 364/426.04, 431.07, 424.03, 424.04, 551.01, 565, 566; 324/160, 161; 320/48, 49; 73/117, 121, 862.11, 488, 862.08; 340/441

[56] References Cited

U.S. PATENT DOCUMENTS

| | | | |
|---|---|---|---|
| 4,361,870 | 11/1982 | D'Agostini et al. | 364/424.03 |
| 4,569,425 | 2/1986 | Kenny et al. | 123/339 |
| 4,593,357 | 6/1986 | Van Ostrand et al. | 364/424.03 |
| 4,860,209 | 8/1989 | Sugimoto et al. | 364/424.02 |
| 5,066,075 | 11/1991 | Kaneda et al. | 303/113 R |
| 5,125,485 | 6/1992 | Lang | 192/1.24 |
| 5,161,634 | 11/1992 | Ichihara et al. | 180/197 |
| 5,165,497 | 11/1992 | Chi | 180/169 |
| 5,193,062 | 3/1993 | Murase et al. | 364/426.04 |

Primary Examiner—Kevin J. Teska
Assistant Examiner—Tan Nguyen
Attorney, Agent, or Firm—S. Pal Asija

[57] ABSTRACT

An on-board robotic system used to control the acceleration, cruising, coasting, braking and idling of electric vehicles. It comprises a microprocessor having a non-volatile memory, a fifth wheel, a stall detection module, an anti-roll module, a brake release and a switch along with a plurality of custom sensors and transducers for actuating various controls of the electric vehicle. The DRIVE which is an acronym for Dynamic Robotic Interface for Vehicle Evaluation mounts in an electric vehicle and regulates the vehicle's speed on a track while a human controls the steering. The system also can test vehicles on a chassis dynamometer without any modification. The main purpose of the DRIVE is to determine driving range of the electric vehicle.

10 Claims, 3 Drawing Sheets

DRIVE FLOW CHART

DRIVE FLOW CHART

ROBOTIC SYSTEM FOR TESTING OF ELECTRIC VEHICLES

SUMMARY

This invention relates to an improvement in robotic systems for automatic testing of electric vehicles. DRIVE is an acronym which stands for Dynamic Robotic Interface for Vehicle Evaluation. It is a robotic system used to control the acceleration, cruising, coasting, braking and idling of electric vehicles during testing on either a closed track or on a chassis dynamometer.

It comprises a microprocessor having a non-volatile memory, a fifth wheel, a stall detection module, an anti-roll module, a brake release and a switch along with a plurality of custom sensors and transducers for actuating various controls of the electric vehicle. The DRIVE mounts in an electric vehicle and regulates the vehicle's speed on a track while a human controls the steering. The main purpose of the DRIVE is to determine the driving range of the electric vehicle.

PRIOR ART

A preliminary prior art search was conducted and furthermore the inventor is intimately familiar with the problem and the prior art.

Prior art robotics test systems are suitable for use on stationary dynamometers only and suffer from numerous problems with respect to suitability for electric vehicle use and cost effectiveness.

Other prior art systems are designed to test only a small part of the electric vehicle rather than the entire vehicle performance in realistic conditions as well as the entire system associated with the electric vehicle.

There is a plethora of prior art test instruments, interfaces and systems. Unfortunately they either address testing of internal combustion engine vehicles or a subsystem of an electric vehicle.

Following are typical examples of the prior art uncovered arranged in the reverse chronological order.
  a) U.S. Pat. No. 5,170,125 entitled, "Tester for the Ignition Module of a vehicle."
  b) U.S. Pat. No. 5,154,076 entitled, "Dynamometer for Simulating the Inertial and Road Load Forces Encountered by Motor Vehicles."
  c) U.S. Pat. No. 5,107,428 entitled, "Process and Apparatus for Diagnosis of Defects in Electric or Electronic Modules in Automotive Vehicles"
  d) U.S. Pat. No. 5,101,660 entitled, "Method and Apparatus for Enabling two or four wheel drive vehicles to be tested under simulated road conditions."
  e) U.S. Pat. No. 5,042,133 entitled, "Testing Method for Electric Shift Control Apparatus".
  f) U.S. Pat. No. 4,986,114 entitled, "Test Apparatus for Motor Vehicles, especially Brake Test Stand for vehicles with Anti-skid Brake Systems."
  g) U.S. Pat. No. 4,617,510 entitled, "Testing Installation for Electric Circuits of a Motor Vehicle."

Unfortunately none of the prior art devices singly or even in combination meet all of the objectives established by the inventor for the Dynamic Robotic Interface for Vehicle Evaluation of this invention.

OBJECTIVES

1. It is an objective of this invention to provide a fully integrated and automatic and simplified testing means for evaluating the total performance of all types of electric vehicles particularly the driving range.

2. Another objective of this invention is to provide a robot-controlled means for testing of electric vehicles on a closed track, wherein a human operator controls the steering only and all the rest is controlled by the robotic interface of this invention mounted in the electric vehicle.

3. Another objective of this invention is to provide an automatic testing means of electric vehicles on a stationary chassis dynamometer.

4. Another objective of this invention is that the testing be accurate, consistent and repeatable.

5. Another objective of this invention is that it include an automatic termination of test criteria such as a low under-load battery voltage of the electric vehicle.

6. Another objective of this invention is that it be easy to use and require no special skill or burden on the part of the test operator.

7. Another objective of this invention is that the DRIVE system of this invention be compact, light weight and low cost.

8. Another objective of this invention is that the test equipment not interfere with the human driver such that tests can be easily conducted on closed tracks in addition to the tests on stationary dynamometers.

9. Another objective of this invention is that the DRIVE system of this invention be modular comprising several sub-systems easily interface-able to each other.

10. Another objective of this invention is that it be safe and reliable.

11. Another objective of this invention is that it entail less noise and less vibration.

12. Another objective of this invention is that it be environmentally safe.

13. Another objective of this invention is that it be physically safe, environmentally safe, noise free and consume little or no energy.

14. Another objective of this invention is that it consume less energy than comparable test systems.

15. Another objective of this invention is that it be easy to use and maintain if not intuitive as well as be fault tolerant such that if an error is made the same is easily correctable.

16. Another objective of this invention is that it meet all federal, state, local and other private standards guidelines, regulations and recommendations with respect to safety, environment, and energy consumption.

17. Another objective of this invention is that it automatically calibrate the actuators when turned on.

18. Another objective of this invention is that it be ergonomically designed to avoid any ill side effects on the health of the operator.

19. Another objective of this invention is that it automatically brake the vehicle to a smooth, safe stop for both normal test termination and if a problem/failure is detected.

20. Another objective of this invention is that the reference test cycle can be easily changed or modified.

21. Another objective of this invention is to incorporate a serial input/output port on DRIVE central controller of this invention to allow system monitoring or modification.

22. Another objective of this invention is that the program utilize an adjustable self-adapting proportional-plus integral-plus derivative control for the system feedback loop.

Other objectives of this invention reside in its simplicity, elegance of design, ease of manufacture, service and use and even aesthetics as will become apparent from the following brief description of the drawings and the detailed description of the preferred embodiment.

BRIEF DESCRIPTION OF THE DRAWING

The objects, features and advantages of the present invention and its application will be more readily appreciated when read in conjunction with the accompanying drawing, in which.

DETAILED DESCRIPTION OF THE PREFERRED EMBODIMENT

Figure 1:
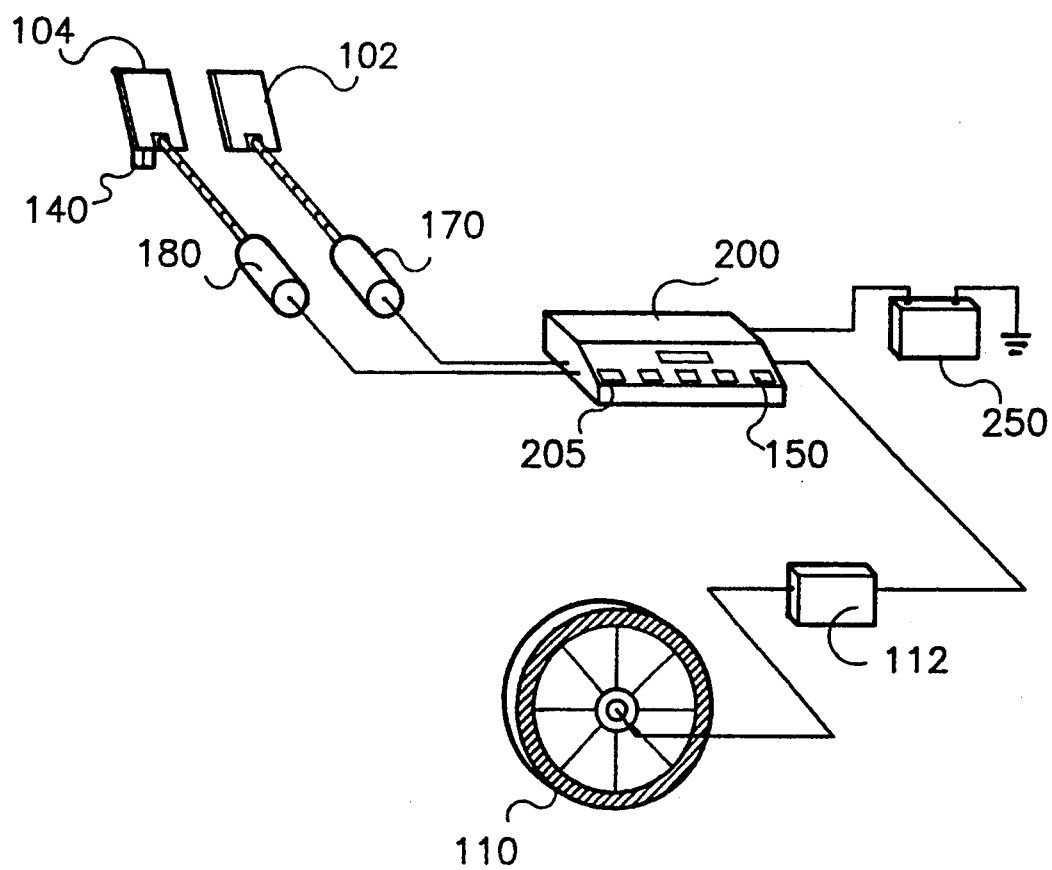
FIG. 1 is a pictorial view of the major subsystems of this invention.

As shown in the drawings wherein like numerals represent like parts throughout the several views, there is generally disclosed an electric vehicle 100 under test having an acceleration means 102 and braking means 104, a Fifth wheel 110, a microprocessor 200 and a battery 250.

As shown in FIG. 1 under the control of the microprocessor control unit 200 which includes stall detection means 120, anti-roll means 130, and emergency switch 150, powered by the battery 250 an accelerator actuator 170 is connected to the accelerator means 102 of the electric vehicle 100. Similarly under the control of the microprocessor 200 powered by the battery 250 a brake actuator 180 is connected to the braking means 104 of the electric vehicle 100. Furthermore under the control of the microprocessor 200 a fifth wheel 110 is monitored by the 5th wheel monitor interface 112. The microprocessor 200 also includes a power supply which converts the 12 volt vehicle electrical power supply into plus five and plus and minus 15 volt direct current regulated supply suitable for the microprocessor and the serial communications link.

Following four sub-systems among others may be simulated by the DRIVE microprocessor 200 or may be hard wired discrete circuits or a hybrid combination of the both for optimal design efficiency. In the preferred embodiment the inventor used hybrid system.

a) Stall Detection Means 120 not only operates in the normal mode but also additionally serves as a valuable safety feature which obviates the need for prior art external limit switches and associated wiring. This subsystem utilizes hard wired circuitry and in conjunction with the test software determines if a pedal (102,104) is truly jammed or is being fully depressed/retracted to meet the demands of the driving test profile.

b) Anti Roll Means 130 automatically detects if the electric vehicle 100 is inadvertently rolling forward or backward and incrementally depresses the brake 104 until the electric vehicle 100 stops. This prevents errant test results, prevents damage to the vehicle 100 or the 5th wheel 110 and utilizes the minimum possible energy to depress and hold the brake pedal 104. It should be noted that an electric vehicle 100 that also has power brakes will consume additional energy in direct proportion to the brake pedal 104 actuation.

c) Brake Release 140 is a quick release mount on the brake pedal 104 for manual override in the event of an emergency. The human operator can therefore override the actuator mechanism 180 by a kick at the brake pedal 104.

d) Emergency Switch 150 is provided in the DRIVE system for emergency accelerator retraction and system shutdown.

Figure 2:
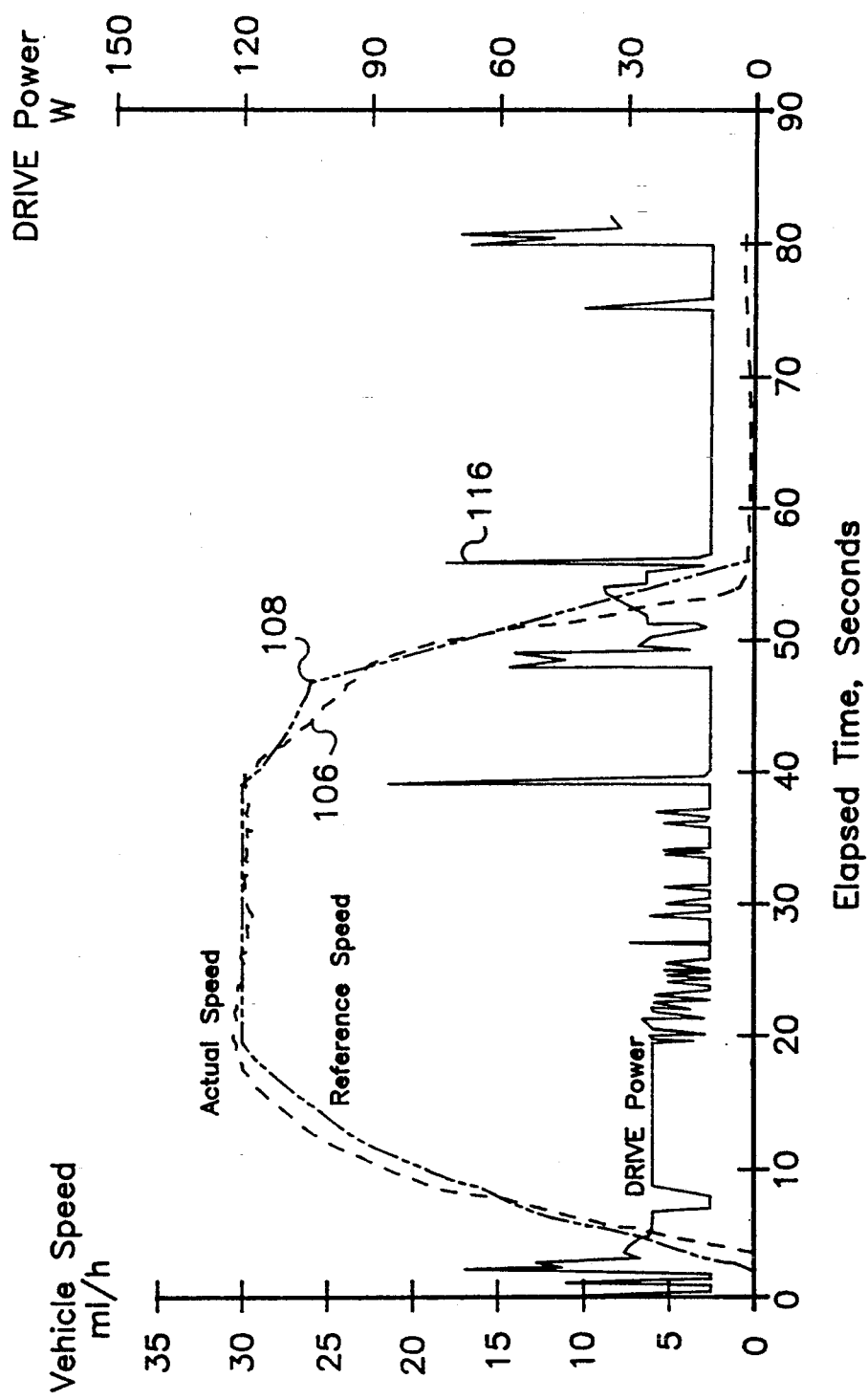
FIG. 2 is a view of the performance graph wherein the vehicle speed is along the Y axis and elapsed time along the x axis.

FIG. 2 shows a typical performance plot of the electric vehicle speed 106 and DRIVE power 116 against elapsed real time in seconds.

Figure 3:
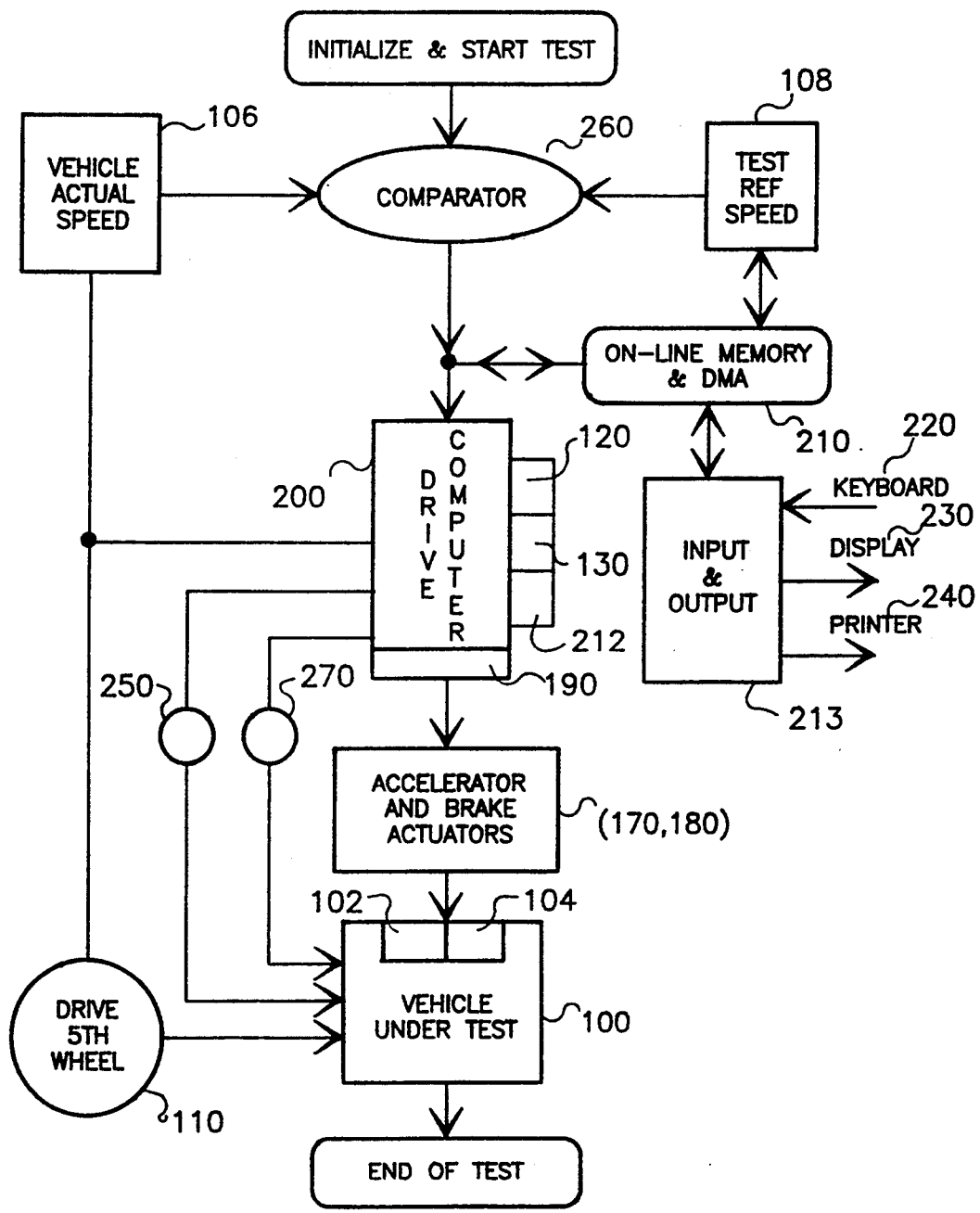
FIG. 3 is a system flow-chart and logic diagram of the Dynamic Robotic Interface for Vehicle Evaluation system of this invention.

As shown in FIG. 3 the microprocessor 200 also known as the DRIVE computer has a plurality of peripherals such as memory 210 having a non-volatile component 212 in which also resides the test program 190, and a display 230. A Keyboard 220 and a printer 240 are optional.

Also shown in FIG. 3 is a software comparator 260 which compares the vehicle's actual speed 106 against test reference speed 108 and under the control of the computer adjusts acceleration pedal 102 via acceleration actuator 170 and brake pedal 104 via brake actuator 180 to ensure that the vehicle actual speed 106 is equal to the test reference speed 108.

To determine the general size and performance requirements for the actuators (170,180) for first time implementation measurements are made in the electric vehicle 100 of the pedal size, pedal travel, floorboard dimensions and force necessary to depress the pedals (102, 104). Once these values are obtained the torque, the speed and the size of the motors and turns ratio of the rods are calculated using well known prior art techniques.

Naturally these measurements are not needed for subsequent vehicles because the drive assembly is adjustable for almost any vehicle and can be fitted into position with minimal effort. The inventor in the preferred embodiment to obtain the pedal force necessary to decelerate the electric vehicle 100 in accordance with the test profile used an "AMETEK" force gauge.

A critical safety feature of the DRIVE is the quick release mechanism 140 that connects the brake actuator 180 to the brake pedal 104. In the preferred embodiment the inventor utilized in the quick release mechanism 140, a silicone tube over a brass pipe that made a friction fit into a machined stainless steel adapter (not shown).

The maximum safe driving range of an electric vehicle is based on the following three factors.
  a) The vehicle's main battery voltage under a predefined load (based on battery's chemistry)
  b) The vehicles ability to maintain the desired cruise speed.
  c) The vehicle's ability to maintain the desired acceleration profile.

The DRIVE not only continually monitors and responds to these parameters, but also safely terminates a test based on potentially hazardous conditions such as excessively high or low speed or stalled actuator motor. It is of critical importance for an electric vehicle test apparatus such the DRIVE system of this invention to properly terminate a driving range evaluation so that the vehicle battery is not over discharged.

The normal end-of-test determination utilizes hardware to isolate and scale both the vehicle's battery 270 voltage and current and the vehicle speed data provided by the fifth wheel to allow monitoring by the DRIVE.

The software then determines if the test should be terminated based on inadequate vehicle acceleration, speed or underload battery voltage. If so the vehicle is gradually braked to a safe stop.

Abnormal end of test determination on the other hand utilizes the fifth wheel for vehicle speed data and the stall detect circuitry which is part of the control unit 200. The control unit 200 comprises the following:

a) Single Board Computer in turn comprising microprocessor, A/D converters, I/O circuits, counters, timers and memory.

b) Power supply and interface circuits including means for converting 12 volt battery supply voltage 250 to logic voltage of plus and minus 5 volts, latching relay circuits to enable or disable motor control via the computer, timers to control the duration of accelerator/brake pedal reaction and circuits to connect between the computer the external devices like the fifth wheel and the electric vehicle's battery 270.

c) Motor drivers comprising MOS(Metal Oxide Semiconductor) power transistors arranged in a bridge configuration to provide forward and reverse operation of the accelerator and brake actuators.

Also included are voltage sensing circuits that detect a motor stall by monitoring the voltage drop across the driver transistors. Also included is a crowbar circuit that disables the DRIVE during emergency conditions.

The software then determines if the test should be terminated due to out of tolerance vehicle speed or actuator stall. In case of an actuator stall, the actuator is temporarily disabled until it is reversed as part of the normal operating cycle. If the actuator is dislodged during reverse operation, the DRIVE continues running normally. On the other hand if the actuator is truly jammed or if the vehicle speed exceeds preset tolerance limits, the vehicle is again gradually braked to a safe stop.

The compact size and light weight of the DRIVE enhances its portability for use in different vehicles.

OPERATION

The test program 190 in non volatile memory 212 upon being turned on initializes various conditions and calibrates the actuators and retracts the actuators to the correct starting position. When the operator presses the start button, the vehicle begins moving under the control of the program. All the operator has to do is steer. The system automatically under the control of the program 190 controls the speed, counts the number of repetitions of the test cycle, terminates the test at the appropriate point, alerts the driver by sounding an alarm such as a "BEEP" when the test is over and stops the electric vehicle 100 with a smooth, controlled braking action.

In addition the DRIVE monitors the unique termination of test criteria for various conditions including but not limited to the following:
(i) Low battery voltage under load
(iii) Inadequate acceleration
(iv) Failure to maintain desired cruise speed.

During normal DRIVE operation the quick release mechanism 140 that connects the brake actuator 180 to brake pedal 104 serves as a rigid pivot for the actuator 180 by rotating over a shoulder bolt. However, in an emergency situation, suitable firm pressure applied to the pedal 104 by the driver disengages the actuator 180 from the pedal 104. Thus the driver can override the DRIVE if any problem develops.

The inventor has given a non-limiting description of the concept. Many changes may be made to this design without deviating from the spirit of the concept of this invention. Examples of such contemplated variations include the following.

a) The logic may be modified without deviating from the spirit and essential functionality of the concept.

b) The invention may be combined with other functions which complement each other with or without synergism.

c) The hardware/software tradeoff may be shifted.

d) The system may be adapted for testing other electric vehicles such as electric buses, electric trains, electric trams etc.

e) The system may be adapted for testing non-electric vehicles such as internal combustion engine automobiles.

f) A different computer may be used with a different combination of peripherals.

Other changes such as aesthetic and substitution of newer materials as they become available which substantially perform the same function in substantially the same way with substantially the same result without deviating from the spirit of this invention may be made.

Following is a listing of the components used in this embodiment arranged in ascending order of the reference numerals for ready reference of the reader.

100=Electric Vehicle Under Test
102=Accelerator Pedal
104=Brake Pedal
106=Actual Speed
108=Test Reference Speed
110=5th Wheel
112=5th Wheel Monitor Interface
116=DRIVE Power
120=Stall Detection Means
130=Anti Roll Means
140=Quick Release Brake Mechanism
150=Emergency Panic Switch
170=Accelerator Actuator
180=Brake Actuator
190=Test Program in Non-volatile Memory
200=DRIVE Computer Control Unit
205=Control Buttons
210=Memory
212=Non-volatile Memory
213=Input/Output Serial Port
220=Keyboard
230=Display
240=Printer
250=12 Volt D C Electric Vehicle Auxiliary Battery
260=Software Speed Comparator
270=Electric Vehicle Traction Battery While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

The inventor claims:

1. A portable on-board robotic system for testing range of an electric vehicle on a test track having an accelerator and a brake comprising:
   a) a microprocessor having a plurality of memory devices including a non-volatile memory and plurality of input and output devices connected to said microprocessor;
   b) an accelerator actuator connected between said microprocessor and said accelerator;
   c) a brake actuator connected between said microprocessor and said brake;
   d) a direct current power source connected to said microprocessor;
   e) a fifth wheel means for inputing actual instantaneous vehicle speed to said microprocessor and connected to said microprocessor;
   f) an end of test program means connected to said microprocessor for automatically determining the end of test as a function of at least one of the following:
      (i) low vehicle battery voltage under load,
      (ii) inadequate acceleration,
      (iii) failure to maintain cruise speed; and
   g) programmed stopping means connected to said test program means for bringing the vehicle to a smooth stop via said brake actuator and said brake.

2. The portable robotic system for on-board testing of an electric vehicle having an accelerator and a brake of claim 1 further comprising:
   a) a closed loop test program residing in said non-volatile memory;
   b) said plurality of input and output devices include a display unit; and
   c) said test program includes a stall detection means connected to said accelerator actuator and said brake actuator; and
   d) an anti roll means connected to said brake actuator.

3. The portable robotic system for on-board testing of an electric vehicle having an accelerator and a brake of claim 2 further comprising:
   a) a quick release brake mechanism means connected between said brake actuator and said brake for uncoupling of said brake actuator from said brake;
   b) said test program includes a plurality of driving profiles and a programmed reference speed; and
   c) a comparator means for comparing said instantaneous vehicle speed and said programmed reference speed.

4. An on-board robotic system for determining the driving distance of an electric vehicle having an accelerator and a brake comprising:
   a) a microprocessor having a plurality of memory devices including a non-volatile memory and plurality of input and output devices including a display unit connected to said microprocessor;
   b) an accelerator actuator connected between said microprocessor and said accelerator;
   c) a brake actuator connected between said microprocessor and said brake;
   d) a direct current power source connected to said microprocessor;
   e) a fifth wheel means for inputing actual instantaneous vehicle speed to said microprocessor and connected to said microprocessor;
   f) a stall detection means connected to said accelerator actuator and said brake actuator;
   g) an anti roll means connected to said brake actuator;
   h) a closed loop test program that resides in said non-volatile memory;
   i) a quick release brake mechanism means connected between said brake actuator and said brake for uncoupling of said brake actuator from said brake; and
   j) an emergency panic switch means to retract said accelerator and shutdown said on-board robotic system in case of an emergency.

5. A portable on-board robotic system for determining on a chassis dynamometer the driving distance of an electric vehicle having an accelerator and a brake comprising:
   a) a microprocessor having a plurality of memory devices including a non-volatile memory and plurality of input and output devices including a display unit connected to said microprocessor;
   b) an accelerator actuator connected between said microprocessor and said accelerator;
   c) a brake actuator connected between said microprocessor and said brake;
   d) a direct current power source connected to said microprocessor;
   e) a fifth wheel means for inputing actual instantaneous vehicle speed to said microprocessor and connected to said microprocessor;
   f) a test program residing in said microprocessor;
   g) said test program includes a programmed reference speed;
   h) a comparator means for comparing said instantaneous vehicle speed and said programmed reference speed;
   i) a stall detection means connected to said accelerator actuator and said brake actuator;
   j) a quick release brake mechanism means connected between said brake actuator and said brake for uncoupling of said brake actuator from said brake; and
   k) an emergency panic switch means for retracting said accelerator and shutting down said on-board robotic system.

6. A method of programming a robotic system for on-board testing and determining the range of an electric vehicle having an accelerator and a brake comprising the steps of:
   a) installing a fifth wheel on said electric vehicle;
   b) installing an accelerator actuator;
   c) installing a brake actuator;
   d) installing a test program in said robotic system;
   e) monitoring actual speed of the vehicle;
   f) reading test reference speed from said microprocessor;
   g) comparing and computing difference delta between the actual speed of said vehicle and test reference speed;
   h) using the delta to control said accelerator actuator and said brake actuator to match the vehicle actual speed with said test reference speed;
   i) detecting stall conditions of the accelerator and brake actuators;
   j) detecting inadvertent roll conditions of said vehicle;
   k) bringing said vehicle to a safe stop when said stall and roll conditions exceed preprogrammed safe operating limits via said brake actuator; and
   l) recording the distance travelled by said vehicle as the driving range of said vehicle.

7. The method of programming a robotic system for on-board testing and determining the range of an electric vehicle having an accelerator and a brake of claim 6 wherein said robotic system monitors said stall detection, and said anti-roll conditions.

8. The method of programming a robotic system for on-board testing and determining the range of an electric vehicle having an accelerator and a brake of claim 6 wherein said robotic system includes a serial input/output port as means for modifying said system's software and for monitoring said software's operation via an external computer.

9. The method of programming a robotic system for on-board testing and determining the range of an electric vehicle having an accelerator and a brake of claim 6 wherein said programmed computer includes a system feedback loop means for governing said robotic systems' response and operation to varying external road grade and wind conditions.

10. The method of programming a robotic system for on-board testing and determining the range of an electric vehicle having an accelerator and a brake of claim 6 wherein said robotic system includes a software comparator as a means for comparing actual speed of the vehicle to the test reference speed and automatically determines end-of-test and is programmed to automatically brake to a smooth safe stop via operation of said brake actuator and said brake.

* * * * *